INVENTOR.
BURTIS W. BENBOW.
BY
Flehr and Swain.
ATTORNEYS.

INVENTOR.
BURTIS W. BENBOW
BY Flehr and Swain
ATTORNEYS.

United States Patent Office 3,224,752
Patented Dec. 21, 1965

3,224,752
CLAMPING DEVICE
Burtis W. Benbow, P.O. Box E, Garberville, Calif.
Filed July 22, 1963, Ser. No. 296,576
7 Claims. (Cl. 269—6)

This invention relates generally to clamping devices of the type generally referred to as C-clamps.

Conventional clamping devices of the C-type, which employ a rigid C-shaped body with a rotatable threaded clamping member, are time consuming in their application and removal. In some instances, a quick sliding adjustment has been provided, but here again the final clamping forces have been applied by rotation of a member.

In general, it is an object of the present invention to provide a clamping device which can be quickly operated to adapt it to different sized objects or workpieces, and which can be quickly applied or released.

Another object of the invention is to provide a clamping device of the above character having a manually operated hand lever which serves not only to facilitate quick adjustment to objects of different sizes, but which in addition provides the final clamping forces.

Another object of the invention is to provide a novel assembly which can be manufactured without undue expense, and which can be used without undue skill on the part of the operator.

Additional objects and features of the invention will appear from the following description in which the preferred embodiment has been set forth in detail in conjunction with the accompanying drawing.

Referring to the drawing.

Figure 1:
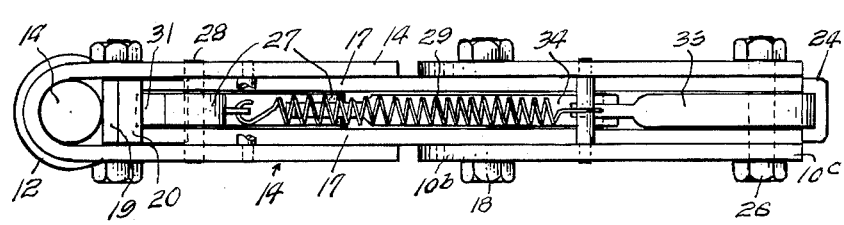
FIGURE 1 is a plan view of a clamping device incorporating the present invention.
Figure 2:
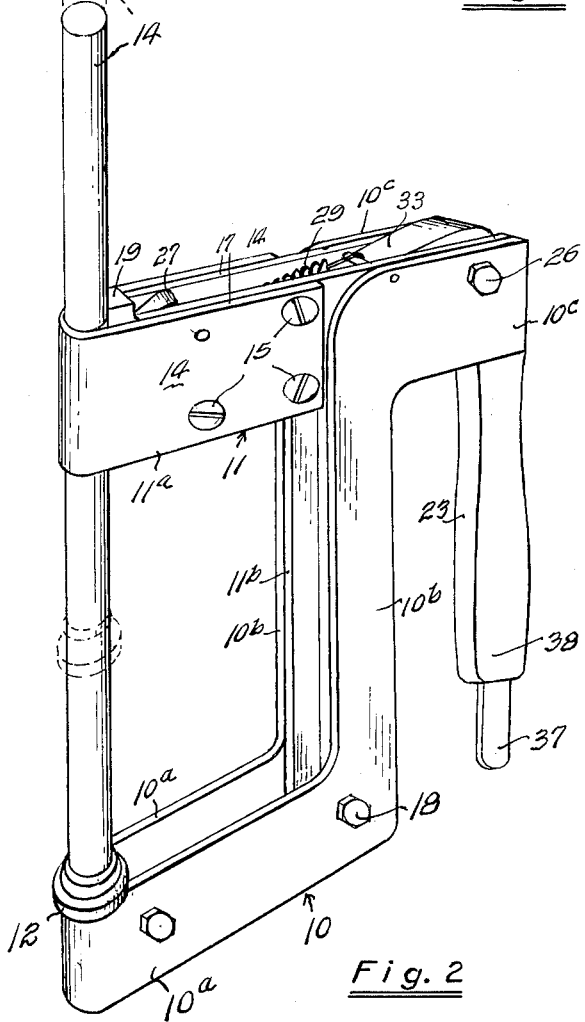
FIGURE 2 is a perspective view of my clamping device.
Figure 3:
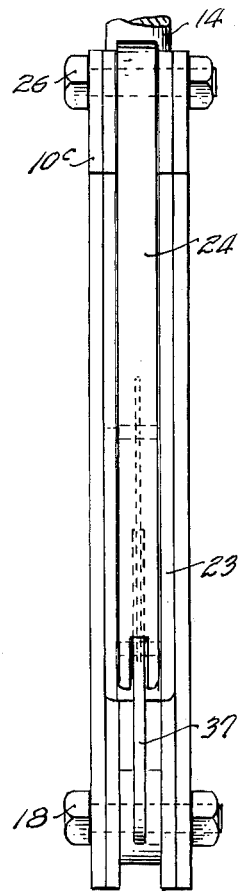
FIGURE 3 is a view of the clamping device looking toward the rear side thereof.

My clamping device consists generally of a body 10 together with a rocker 11, these parts being assembled to form a generally C-shaped arrangement.

The body 10 is generally L-shaped. The branch 10a of the body 10 is provided with a clamping head or anvil 12. This can be in the form of an enlarged head 12 upon the mounting pin 13. The branch 11a of the rocker 11 serves to carry the clamping member 14, which can be in the form of a rod of substantial length. The branch 10b of the body 10 is substantially at right angles to the branch 10a. Rocker 11 also has an arm 11b substantially at right angles to the arm 11a, and which in the assembly extends generally parallel to the body branch 10b.

While the parts described above can be constructed in various ways, it is convenient to form the body of sheet metal which is doubled upon itself in the manner illustrated. Also it is convenient to form the rocker 11 from one piece of metal 14 which is doubled upon itself, and which is attached as by screws 15, rivets or welding to a pair of L-shaped metal members 17, which complete the rocker.

Figure 4:
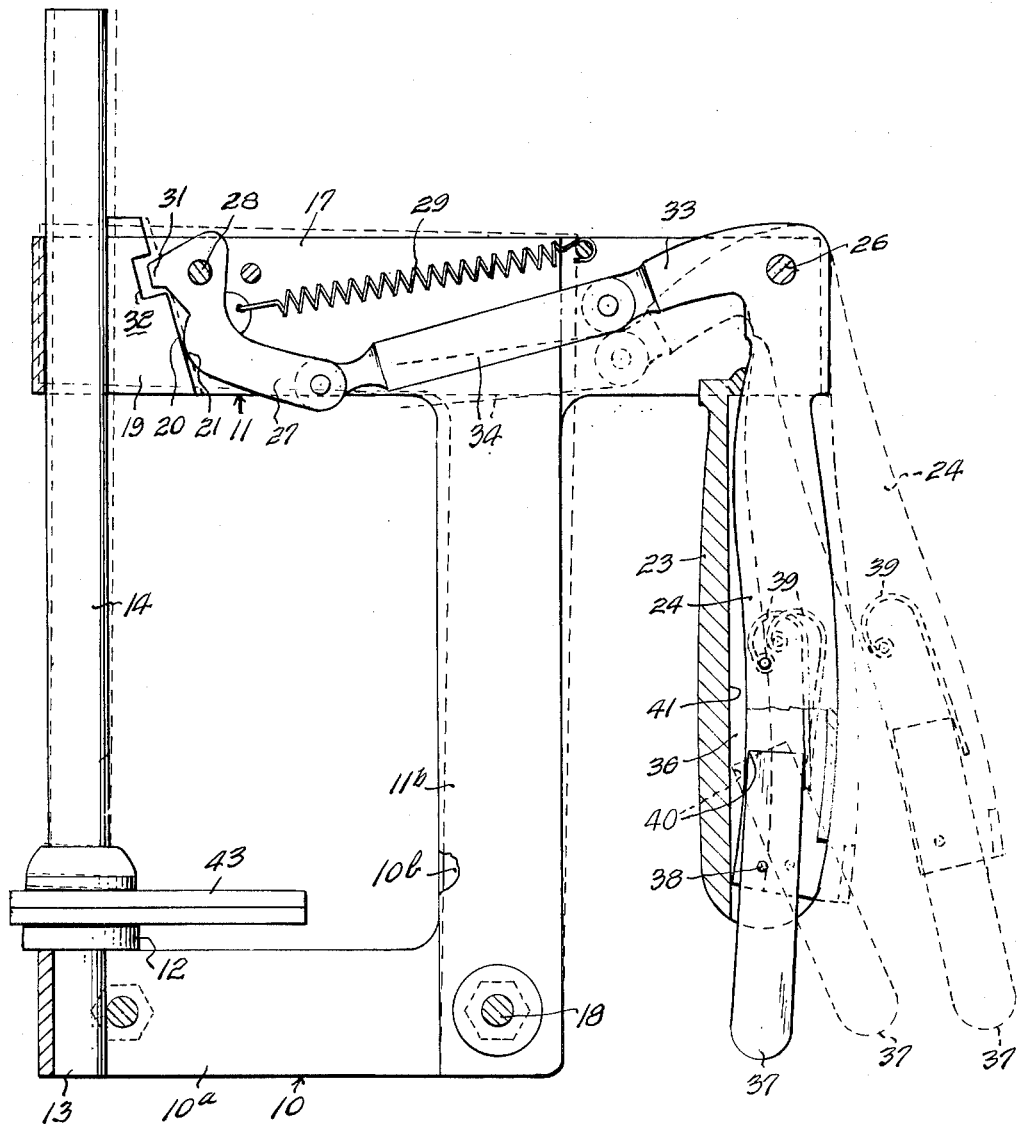
FIGURE 4 is a side elevational view of the clamping device, in section.

The lower extremity of the rocker arm 11b, as viewed in FIGURE 4, is connected by the pivot pin or bolt 18 to the body 10. In normal operation of the device, the rocker moves a limited amount relative to the body.

In addition to the clamping member 14, the arm 11a carries a wedge-shaped clamping block 19. One face of this block is adapted to contact the adjacent surface of the clamping member 14, and the inclined face 20 engages the camming portions 21 which constitute the adjacent end edges of the metal members 17. When the block 19 is moved upwardly as viewed in FIGURE 4, it is jammed against the member 14 to hold this member in a fixed position with respect to the arm 11a. When it is moved downwardly from the position shown in FIGURE 4, its clamping engagement is released, thus permitting the member 14 to be freely slid in opposite directions.

The body 10 is provided with rear extensions 10c which serve to mount the hand grip or handle 23. Manually operated means serves to move the clamping block 19 between released and clamping positions, and in addition serves to effect relative movement between the rocker and the body to apply forces to an object or workpiece, after quick adjustment of the clamping member. In general this means includes a hand operated lever 24, which is secured by pivot pin 26 to the body extension 10c. A block operating member 27 is carried by pivot pin 28 on the arm 11a, and is urged in a counterclockwise direction as viewed in FIGURE 5, by the tension spring 29. A lug 31 on the member 27 loosely engages within a notch 32 in the block 19. The hand lever 24 is provided with a lever arm 33, which is operatively connected to the free end of the block operator 27 by the links 34.

The hand grip 23 is provided with a slot 36 to accommodate the hand lever 24 in its full clamping position. The free end of the hand lever 24 is also provided with an assist rocker 37. This rocker is pivotally secured intermediate its ends by pivot pin 38 to the free end of hand lever 24, and it is urged in a counterclockwise direction as viewed in FIGURE 4, by the spring 39. It extends beyond the extremity of the grip 23, as shown in FIGURE 4, so that it can be engaged by the fingers of the operator. When moved to the right as viewed in FIGURE 4, the upper end 40 of this rocker presses against the surface 41 of the grip 23, thus initiating outward movement of the hand lever 24.

The operation of my device is as follows. Before it is applied to clamp against an object or workpiece, the hand lever 24 is swung to its outer position shown in dotted lines in FIGURE 4. This serves to position the clamping block 19 in its released position with respect to the clamping member 14. The operator may now freely slide the clamping member 14 toward or away from the head 12. The operator now positions the device whereby the anvil or head 12 is on one side of the object 43 to be clamped, and then the clamping member 14 is slid manually until it engages the other side. Thereafter, the operator engages the grip 23 and the hand lever 24 with one hand, and forces the hand lever to the position shown in solid lines in FIGURE 4. During the initial part of this movement, the clamping block operator 24 is rotated in a clockwise direction whereby the block 18 is jammed against the member 14. Further movement of the hand lever 24 causes the entire rocker 10a and the parts carried by the same to rotate a small amount in a counterclockwise direction about the pivotal bolt 18, thus moving the clamping member 14 against the object 43 and developing the desired clamping force. When the lever 24 is in its full clamping position shown in solid lines in FIGURE 4, the link 34 is moved slightly past its center position, thus serving as self-locking means to retain the hand lever 24 in the full clamping position.

When it is desired to release the object, the operator applies force to the projecting end of the assist rocker 37, which thereupon rotates in a counterclockwise direction about its pivot pin 38, to initiate outward movement of the lever 24. The first movement of this lever causes movement of the rocker 11 relative to the body, together with the parts carried by the rocker, thus relieving the clamping forces upon the object 43. Further movement of the hand lever to its limiting release position moves the clamping block 18 to its release position, thus again permitting free sliding adjustment of the clamping member 14.

In connection with the above it will be noted the angle of the surface 20 is such that when member 27 is rotated clockwise the thrust applied to surface 20 from the portion 21 does not create a vertical component sufficient to force the block 19 downwardly. As soon as the block 19 is forced against the rod 14 the position of the block is fixed with respect to its vertical position by virtue of the resistance to sliding motion upon the surface of the rod. Thus when one commences to move the hand lever 24 toward the grip 23, the thrust of portion 21 against inclined surface 20 adequately fixes the block 19 to the rod 14, and thereafter there is a fixed relationship between rod 14 and the rocker which is adequate to provide the desired clamping forces. There is a relatively loose relationship between portion 31 and the recess 32. Portion 31 serves primarily to release the wedge block when the hand lever 24 is swung outwardly to the dotted line position shown in FIGURE 4. However, at the same time it prevents the block 19 from being dislodged from the assembly.

It will be evident from the foregoing that I have provided a clamping device which can be quickly operated without undue skill on the part of the operator, and which can be quickly adjusted over a wide range, applied with predetermined clamping force, and then released, all without time consuming operation of threaded parts or like devices.

Although my device is in the form of a C-clamp, it will be evident that it serves the function of what is commonly referred to as a bench vise. Thus the body may be applied to a fixed support or table in any desired position. Also the body may be constructed whereby it can be attached to a supporting surface or table, with another part forming the clamping surface or anvil against which the clamping member 14 operates.

I claim:

1. In a clamping device, a substantially L-shaped body, one branch of the body having a clamping surface thereon, a substantially L-shaped rocker, one arm of said rocker extending generally parallel to the other branch of the body and having its end pivotally secured thereto, the other arm of the rocker extending generally parallel to said one branch of the body, an elongated clamping member slidably carried by the end of said other arm of the rocker, a wedge block movably carried by said other arm of the rocker and movable between release and clamping positions, said block in its clamping position serving to fix the elongated member with respect to the rocker and in its released position permitting the elongated member to be slidably moved relative to the rocker, a hand lever pivotally secured to the body, lever and linkage mechanism operatively connecting the hand lever to said block, said lever and linkage mechanism being so formed that when the hand lever is moved to its full clamping position from a released position, the block is first moved to its clamping position to fix the elongated clamping member and then the rocker is moved relative to the body to move the elongated clamping member toward said clamping surface, 2. A clamping device as in claim 1 in which said mechanism comprises a lever arm fixed to the hand operated lever, a pivotally mounted block engaging operating member for moving the block between its released and engaged positions, and a link serving to connect said lever arm with said operating member, the points of pivotal connection of the hand lever to the body and of the lever arm to the link and of the link to the operator passing through dead center position as the hand lever is moved to full clamping position.

3. A clamping device as in claim 2 in which a hand grip is fixed to the body, and in which the hand lever moves to a position substantially parallel to the hand grip in its full clamping position.

4. A clamping device as in claim 3 in which an assist rocker is pivotally attached to the free end of the hand lever, said rocker being manually engageable to initiate movement of the hand lever in a direction away from the hand grip.

5. In a clamping device, a rigid body part having a clamping surface on one end portion of the same and having a hand grip, an elongated clamping member for clamping objects between the same and said clamping surface, rocker means movably carried by the body serving to slidably carry said clamping member, a hand operated lever pivotally secured to the body and movable toward and away from the hand grip, and means connected to said lever and actuated by movement of the same to releasably fix the clamping member to said rocker means and to move said rocker means to urge said clamping member against an object disposed between the same and the clamping surface.

6. A clamping device as in claim 5 in which the rocker means is in the form of an L-shaped rocker and in which the body is likewise L-shaped, the rocker being assembled with respect to the body whereby one arm of the rocker extends generally parallel to one branch of the body, said assembly being substantially C-shaped, the end of said one arm of the rocker being pivotally secured to the body, and the end of the other arm of the rocker having means for slidably retaining said clamping means.

7. A clamping device as in claim 5 in which the means connected to said hand lever and actuated by movement of the same includes a wedge block adapted to be forced against the elongated clamping member to fix the same, and linkage means interconnecting the wedge block with said hand operated lever for moving the wedge block between release and clamping positions, said linkage means also serving to apply forces between the body and the rocker means to cause relative movement between the same.

References Cited by the Examiner
UNITED STATES PATENTS
2,947,333   8/1960   Johnson _____ 269—170

ROBERT C. RIORDON, *Primary Examiner.*
FRANK SUSKO, *Examiner.*